US008248018B2

(12) United States Patent
Maekawa et al.

(10) Patent No.: US 8,248,018 B2
(45) Date of Patent: Aug. 21, 2012

(54) MOTOR CONTROLLER, MOTOR CONTROL SYSTEM, AND WASHING MACHINE

(75) Inventors: Sari Maekawa, Kanagawa (JP); Kazunobu Nagai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 285 days.

(21) Appl. No.: 12/579,857

(22) Filed: Oct. 15, 2009

(65) Prior Publication Data

US 2010/0090640 A1    Apr. 15, 2010

(30) Foreign Application Priority Data

Oct. 15, 2008    (JP) ................................ 2008-266386

(51) Int. Cl.
*H02P 1/46* (2006.01)

(52) U.S. Cl. .. 318/701; 310/46; 310/49.46; 310/156.03; 68/139; 68/212; 318/700; 318/718; 318/400.01; 318/400.35; 318/400.29; 324/252; 324/260

(58) Field of Classification Search ........ 318/400.01–400.35, 700, 701, 318/718; 310/156.01, 156.03, 156.44, 154.28, 310/46, 49.46; 324/200, 765.01, 252, 260; 68/139, 212

See application file for complete search history.

(56) References Cited

U.S. PATENT DOCUMENTS

| 5,689,166 | A * | 11/1997 | Nagayama et al. | ........... 318/721 |
| 5,808,392 | A * | 9/1998 | Sakai et al. | ................... 310/214 |
| 6,087,751 | A * | 7/2000 | Sakai | ....................... 310/156.56 |
| 7,622,883 | B2 * | 11/2009 | Kaizuka et al. | .............. 318/730 |
| 2004/0100221 | A1 * | 5/2004 | Fu | ................................ 318/700 |
| 2008/0169717 | A1 * | 7/2008 | Takashima et al. | ........... 310/114 |

FOREIGN PATENT DOCUMENTS

| DE | 3334149 A | * | 4/1985 |
| JP | 2002-164213 | | 6/2002 |
| JP | 2002164213 A | * | 6/2002 |
| JP | 2006-280195 | | 10/2006 |
| JP | 2006280195 A | * | 10/2006 |
| JP | 2008-29148 | | 2/2008 |
| JP | 2008029148 A | * | 2/2008 |
| JP | 2008-245362 | | 10/2008 |

OTHER PUBLICATIONS

U.S. Appl. No. 12/635,130, filed Dec. 10, 2009, Maekawa, et al.
Office Action issued Apr. 5, 2011, in Japan Patent Application No. 2008-266386 (with English translation).

* cited by examiner

*Primary Examiner* — Bentsu Ro
*Assistant Examiner* — Jorge Carrasquillo
(74) *Attorney, Agent, or Firm* — Oblon, Spivak, McClelland, Maier & Neustadt, L.L.P.

(57) ABSTRACT

A motor controller controlling a permanent magnet motor including a rotor provided with a plurality of low coercivity permanent magnets having a coercivity low enough to allow modification in amount of magnetization, the motor controller including a position detector including one or more position sensors to detect a rotational position of the rotor; an inverter circuit connected between a direct current voltage supply source and windings of the permanent magnet motor and configured by a plurality of semiconductor switching elements of multiple phases connected thereto; and a magnetization controller that magnetizes the plurality of low coercivity permanent magnets constituting the rotor by energizing the windings of the permanent magnet motor through the inverter circuit such that all of the low coercivity permanent magnets are magnetized to a uniform level of magnetization by energizing the windings twice at same timings specified based on a sensor signal outputted by the position sensor.

9 Claims, 11 Drawing Sheets

MOTOR CONTROLLER, MOTOR CONTROL SYSTEM, AND WASHING MACHINE

CROSS REFERENCE TO RELATED APPLICATIONS

This application is based upon and claims the benefit of priority from the prior Japanese Patent Application 2008-266386, filed on, Oct. 15, 2008 the entire contents of which are incorporated herein by reference.

FIELD

The present disclosure relates to a motor controller that drives a permanent magnet motor having a permanent magnet provided at its rotor, more specifically, a permanent magnet having coercivity low enough to allow modification in its amount of magnetism. The present disclosure also relates to a motor control system provided with the aforementioned permanent magnet motor and the motor controller, and washing machine controlled by such motor control system.

BACKGROUND

One of the recent wide spreading technologies for reducing electricity consumption is a field oriented control or vector control of an inverter driven permanent magnet motor to provide a variable control of speed ranging from low speed to high speed. Patent publication JP 2006-280195 A, for instance, discloses a permanent magnet motor allowing improvement in motor efficiency throughout its range of speed variability and improvement in reliability. The disclosed motor includes a wound stator, and a rotor provided with a permanent magnet having a low level coercivity low enough to allow irreversible change in the density of magnetic flux by the magnetic field generated by stator winding current and a permanent magnet motor having a high level coercivity high enough to be as twice as high as the low level coercivity. When rotating at high speed at a power supply voltage equal to or greater than the maximum voltage, adjustment is made to reduce the amount of full linkage flux by the low and high coercivity permanent magnet motors through adjustment in the amount of full linkage flux by magnetizing the low level coercivity permanent magnet by the magnetic field generated by electric current.

JP 2006-280195 A performs irreversible demagnetization by controlling the energization of d-axis current obtained by vector control calculation. The above arrangement will not encounter any problems in a permanent motor employing a 2 pole 3 slot structure since energization is required only once for magnetizing the permanent magnet However in a motor employing a 4 pole 3 slot structure, for example, magnetizing properties are greatly influenced by the count of energization of d-axis current, location of magnetization, and further the count of motor rotation when being magnetized.

SUMMARY

One of the advantages of the present invention is that it provides a motor controller allowing magnetization of permanent magnets provided in a motor having four or more poles using a low cost position sensor, a motor control system provided with the permanent magnet motor and the motor controller and a washing machine.

In one aspect of the present invention there is provided a motor controller that controls a permanent magnet motor including a rotor provided with a plurality of low coercivity permanent magnets having a coercivity low enough to allow modification in amount of magnetization, the motor controller including a position detector including one or more position sensors to detect a rotational position of the rotor; an inverter circuit that is connected between a direct current voltage supply source and windings of the permanent magnet motor and that is configured by a plurality of semiconductor switching elements of multiple phases connected thereto; and a magnetization controller that magnetizes the plurality of low coercivity permanent magnets constituting the rotor by energizing the windings of the permanent magnet motor through the inverter circuit such that all of the low coercivity permanent magnets are magnetized to a uniform level of magnetization by energizing the windings twice at a same electric angle belonging to different electric angle periods specified based on a sensor signal outputted by the position sensor.

In another aspect of the present invention, there is provided a motor control system employing the motor controller.

Yet, in another aspect of the present invention, there is provided a washing machine employing the motor control system. According to the above described configuration, rotational drive force can be generated for executing a wash operation by the permanent magnet motor and the motor properties can be optimized by modifying the amount of magnetization of the permanent magnet motor through the motor controller depending upon the mode of wash operation.

DETAILED DESCRIPTION

Figure 1:
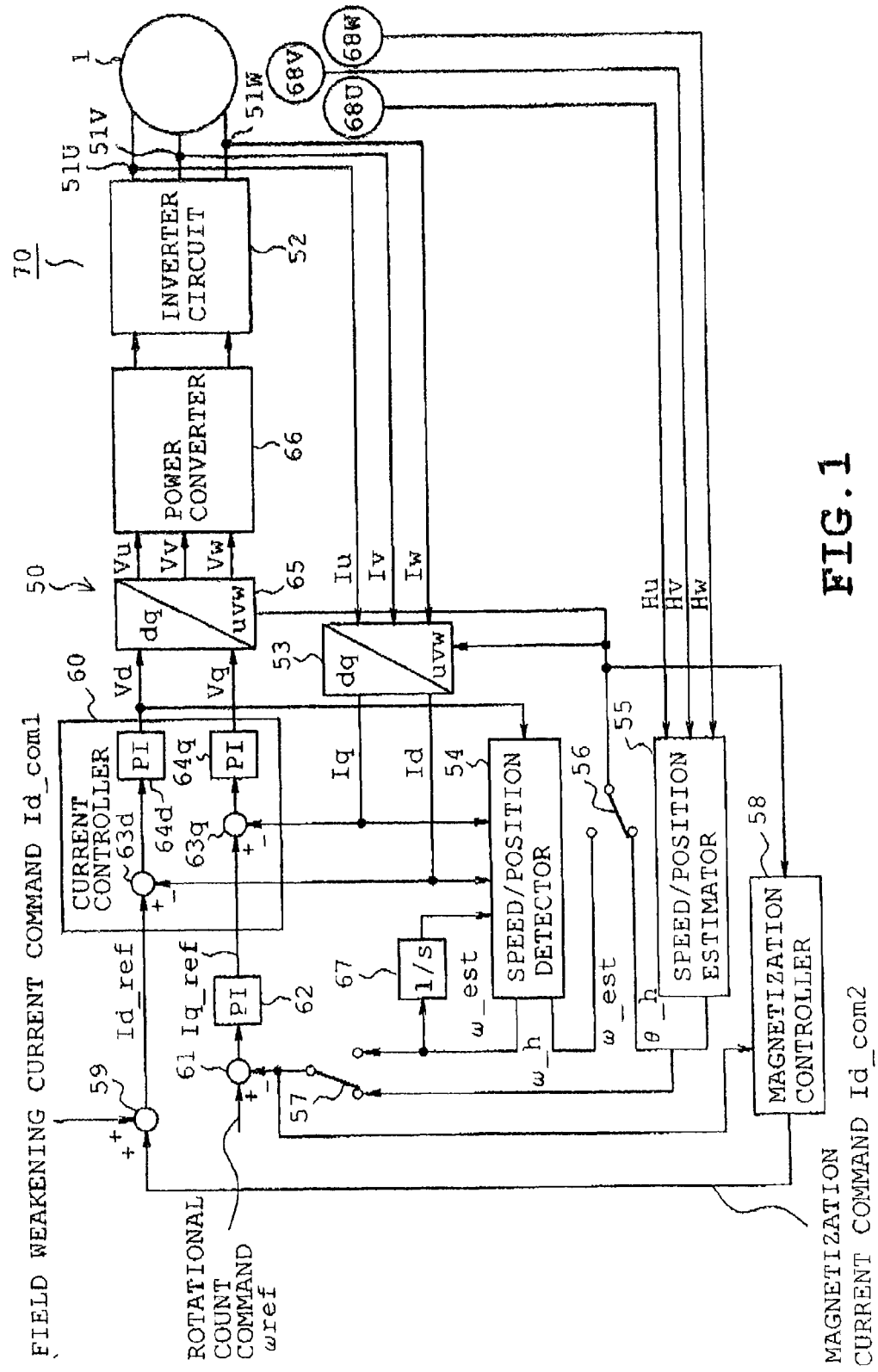
FIG. 1 shows a functional block diagram of a configuration for executing a field oriented control of motor rotation according to a first exemplary embodiment applying the present invention to a washing machine.

One exemplary embodiment of the present invention will be described hereinafter with reference to FIGS. 1 to 9. FIG. 2A is a plan view depicting the rotor configuration of permanent magnet motor 1 of an outer rotor brushless type and FIG. 2B is a corresponding perspective view. The features of permanent magnet motor 1 are similar to those of the motor disclosed in JP 2006-280195 A except for its outer rotor configuration.

Permanent magnet motor 1 includes stator 2 and rotor 3 provided at the outer periphery of stator 2. Stator 2 comprises stator core 4 and stator winding 5. Stator core 4 is made of laminated layers of blanked silicon steel sheets that are magnetically soft. The laminated silicon steel sheets are secured together by caulking. Stator core 4 includes an annular yoke 4a and a multiplicity of teeth 4b extending radially from the outer periphery of yoke 4a. The surface of stator core 4 is coated by a mold resin such as PET resin except for outer peripheral surface 4c or the tip surfaces of teeth 4b that confront the inner peripheral surface of rotor 3 over a gap.

At the inner periphery of stator 2, a plurality of mounts 6 are molded integrally that are made of PET resin. Mounts 6 are provided with a plurality of screw holes 6a for screw fastening mount 6 so that stator 2 is secured on the rear surface of tub 25 of drum washer dryer 21 shown in FIG. 3. Stator winding 5 comprises a three-phase winding and is wound on to each of teeth 4b.

Rotor 3 is integrally structured by frame 7, rotor core 8, and a plurality of permanent magnets 9 molded by a mold resin not shown. Frame 7 is made of magnetic material such as a steel sheet pressed into a form of a flat bottom cylinder. Rotor core 8 comprises soft magnetic silicon steel sheets blanked in substantially annular form that are laminated and caulked together. Rotor core 8 is disposed on the inner periphery of frame 7. The inner peripheral surface of rotor core 8 which confronts the outer peripheral surface of stator 2 or the stator core 4 over a gap is contoured by a plurality of protrusions 8a oriented inward and protruding circumferentially.

Protrusions 8a have a rectangular insert hole 13 defined on them that run in the axial direction of rotor core 8 or the direction of lamination of the silicon steel sheets so as to penetrate protrusions 8a. Insert holes 13 comprise insert holes 13a and 13b that differ in their widths of the shorter sides and are situated alternately along the circumference of rotor core 8.

Permanent magnet 9 comprises a rectangular neodymium magnet 9a which is a high coercivity magnet inserted into insert hole 13a and a rectangular alnico magnet 9b which is a low coercivity magnet inserted into insert hole 13b. The coercivity of neodymium magnet 9a is approximately 900 kA/m which is as much as nine times the coercivity of alnico magnet 9b which is approximately 100 kA/m. To summarize, permanent magnet 9 is configured by two types of permanent magnets 9a and 9b that differ in coercivity and that are arranged alternately in a substantially annular layout within rotor core 8.

The evaluation of coercivity of neodymium magnet 9a being high and alnico magnet 9b being low is based upon a relative comparison in that neodymium magnet 9a does not change its amount of magnetism when exposed to electric current in the magnitude that would change the amount of magnetism of alnico magnet 9b upon energization of magnetizing current through stator 2.

Further, each of the two types of permanent magnets 9a and 9b represent a magnetic pole and are each disposed so that their direction of magnetization are oriented along the radial direction of permanent magnet motor 1, in other words, in the direction oriented from the outer peripheral portion of permanent magnet motor 1 to the gap residing between stator 2 and rotor 3. When the two types of permanent magnets 9a and 9b are disposed alternately and oriented such that their direction of magnetization are oriented along the radial direction, the magnetic poles of the permanent magnets 9a and 9b disposed adjacent to the other reside in opposite directions, meaning that the N-pole of either of the magnet types resides in the inner side and the N-pole of the remaining other magnet type resides in the outer side. As a result, a path of magnetism, in other words, magnetic flux is generated between neodymium magnets 9a and alnico magnets 9b in the direction indicated by arrow B in FIG. 2B. The arrow represented by broken line at the upper portion of FIG. 2B indicates the direction in which the magnetic flux passes through rotor core B. This means that magnetic path is formed so as to pass through both neodymium magnet 9a having relatively greater coercivity and alnico magnet 9b having less coercivity.

Permanent magnet motor 1 takes a 48 pole 36 slot configuration which can also be described as 4 pole 3 slot meaning that 4 poles are associated with 3 slots.

Figure 3:
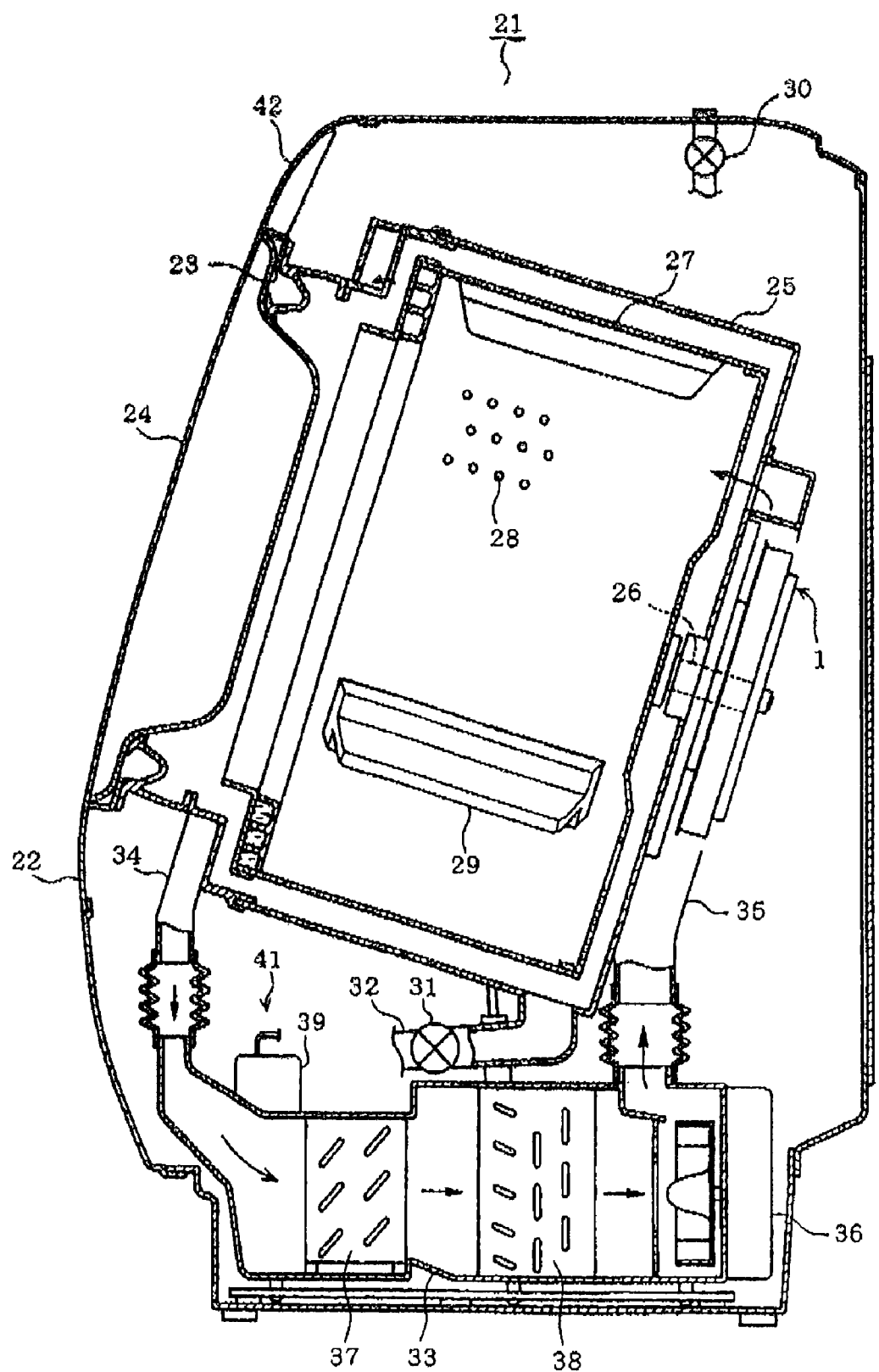
FIG. 3 is a vertical cross sectional side view of a washer dryer.

Next, a description will be given on a washer dryer 21 provided with the above described permanent magnet motor 1. FIG. 3 is a vertical cross sectional side view schematically describing the interior configuration of drum type washer dryer 21. Exterior housing defining the outline of drum type washer dryer 1 has a round opening 23 defined on its front face for loading and unloading of laundry. Opening 23 is opened/closed by door 24. Exterior housing 22 contains a cylindrical water tub 25 having enclosed bottom and a rear side surface. On the central rear surface of water tub 25, the above described permanent magnet motor 1, more specifically, stator 2 is screw fastened. Permanent magnet motor 1 has a rotary shaft 26 having its rear end, the right side end as viewed in FIG. 3, secured on mount 10 of permanent magnet motor 1, more specifically, rotor 3 and its front end, the left side as viewed in FIG. 3, protrudes into water tub 25.

At the front end of rotary shaft 26, a cylindrical drum 27 having an enclosed bottom and rear surface is secured so as to be coaxial with water tub 25 and drum 27 is driven in rotation integrally with rotor 3 and rotary shaft 26 by permanent magnet motor 1. Drum 27 is provided with a plurality of through holes 28 allowing airflow and water flow to pass through them and a plurality of baffles 29 for turning and untangling the laundry inside the rotating drum 27. Water tub 25 is connected to water valve 30 that when opened supplies water into water tub 25. Water tub 25 is further connected to drain hose 32 having drain valve 31 that when opened, drains the water inside water tub 25.

Below water tub 25, airflow duct 33 is provided that extends in the front and rear direction. The front end of airflow duct 33 communicates into water tub 25 through front duct 34, whereas the rear end communicates into water tub 25 through rear duct 35. At the rear end of airflow duct 33, blower fan 36 is provided which causes the air within water tub 25 to flow from front duct 34 into airflow duct 33 and circulated back into water tub 25 through rear duct 35.

Figure 4:
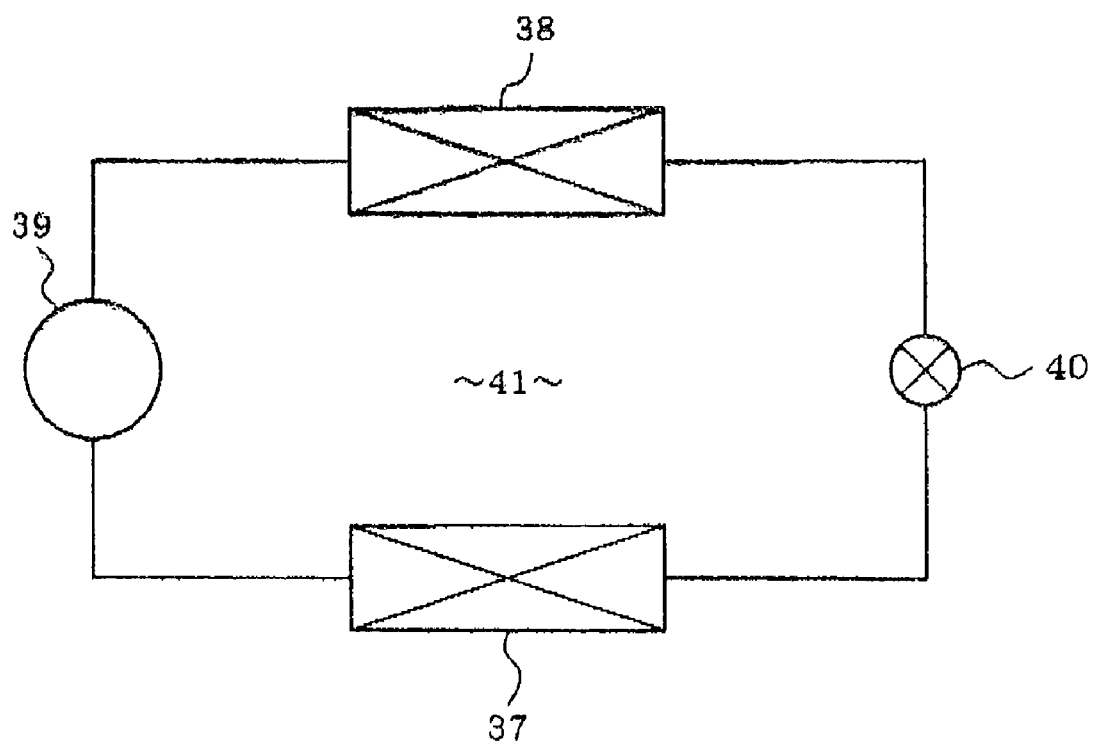
FIG. 4 depicts a configuration of a heat pump.

At the forward interior of airflow duct 33 evaporator 37 is provided whereas condenser 38 is provided at the rear interior. Evaporator 37 and condenser 38 along with compressor 39 and check valve 40 constitute heat pump 41 as shown in FIG. 4 in which the air flowing within airflow duct 33 is dehumidified by evaporator 37 and heated by condenser 38 to be circulated back into water tub 25. Check valve 40 comprises an expansion valve which can be opened in controlled amounts.

On the front face of exterior housing 2 above door 24, control panel 42 configured by a microcomputer is provided that is connected to control circuitry not shown that controls the overall operation of drum type washer dryer 21. Control circuitry executes various operational courses through control of components such as permanent magnet motor 1, water valve 30, drain valve 31, compressor 39, and check valve 40 according to the settings made through control panel 42.

Though not shown, the compressor motor provided at compressor 39 is configured substantially the same as permanent magnet motor 1.

Figure 2A:
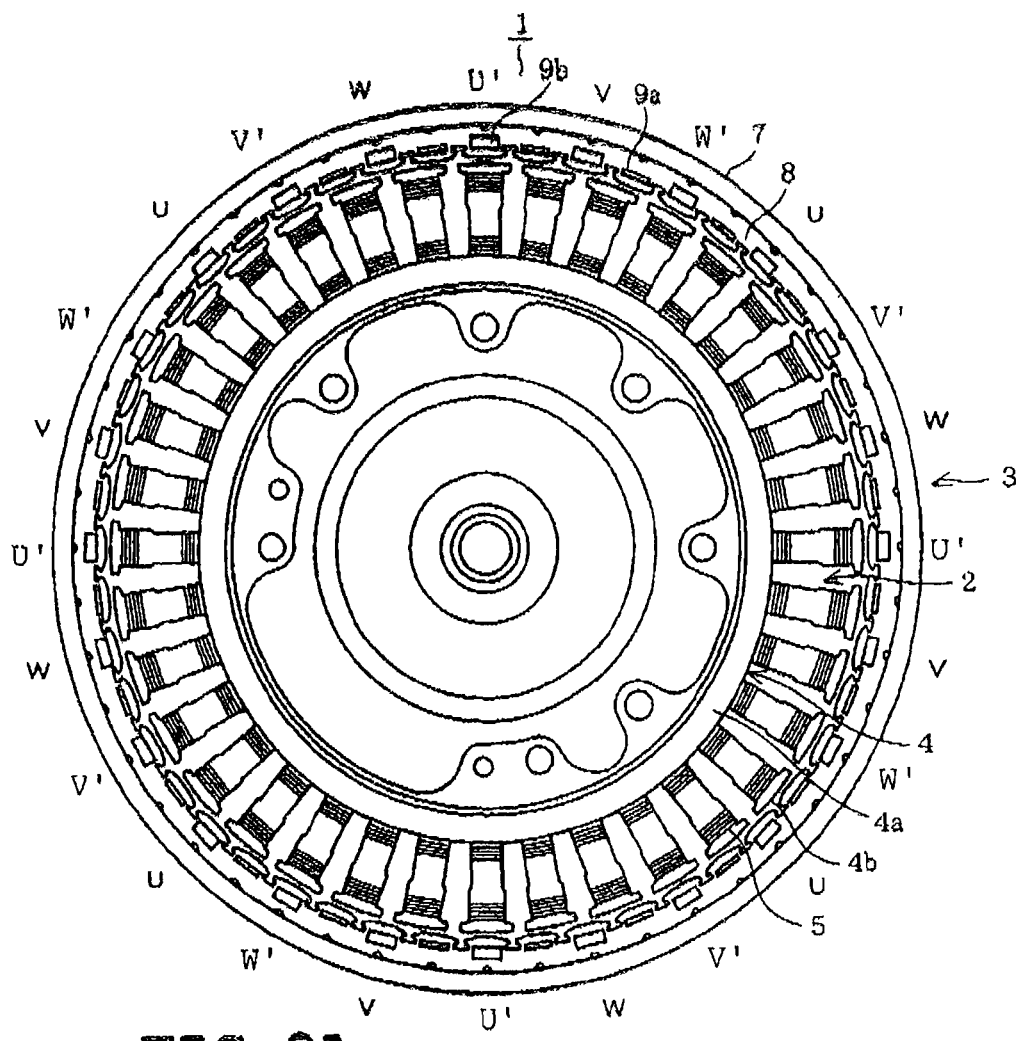
FIG. 2A is a plan view of a permanent magnet motor when viewed from a stator side.
Figure 2B:
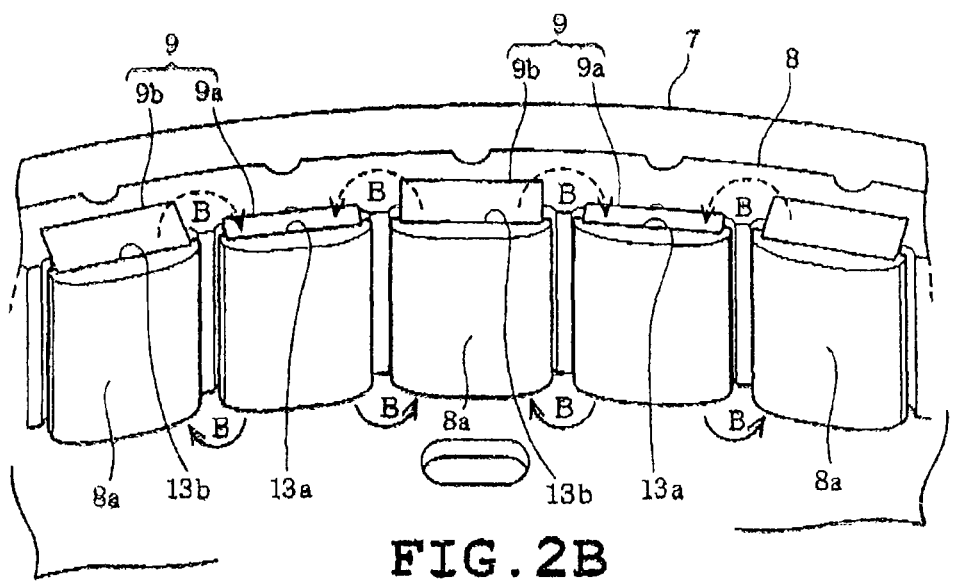
FIG. 2B is a partial perspective view of a rotor.

FIG. 1 is a block diagram describing the configuration of motor controller 50 that control the rotation of permanent magnet motor 1 by way of field oriented control or vector control. The compressor motor is also controlled in a similar, fashion. In a field oriented control, current flowing in armature winding is divided into the direction of magnetic flux of the permanent magnet serving as the field and the direction orthogonal to the direction of magnetic flux and are controlled independently to allow control of magnetic flux and generated torque. Current control is executed through current parameters represented in d-q coordinate system which is a coordinate system that rotates with rotor 3 of motor 1. D-axis represents the direction of magnetic flux generated by the permanent magnet mounted on rotor 3 and q-axis represents the direction orthogonal to the d-axis. Among the current flowing in the windings, q-axis current Iq representing the q-axis component is a torque component current that generates rotational torque, whereas d-axis current Id representing d-axis component is an excitation or magnetization current component that generates magnetic flux.

Current sensors 51U, 51V, and 51W sense currents Iu, Iv, and Iw flowing in each of the three phases, that is, U-phase, V-phase, and W-phase of motor 1. Of note is that the U-phase, V-phase, and W-phase are also described as U', V', and W' when distinction is required such as in FIG. 2. Currents Iu, Iv, and Iw may be detected by replacing current sensor 51 with a configuration in which three shunt resistors are provided between the switching elements and the ground of the lower arm of inverter circuit 52.

Currents Iu, Iv, and Iw sensed by current sensor 51 undergo A/D transformation by A/D transformer not shown and is thereafter transformed into two-phase currents Iα and Iβ by uvw/dq coordinate transformer 53 to be further transformed into d-axis current Id and q-axis current Iq. The symbols α and β represent the coordinate axis of the dual axis coordinate system fixed to stator 2 of motor 1. In the calculation for coordinate transformation, phase 9 is selected and outputted by switch 56 from either of: rotational position estimate θ_est of rotor estimated by speed/position estimator 54 which may also be described as an estimate of phase difference between α-axis and d-axis; or detected rotational position θ_h detected by speed/position detector 55. Further, rotational speed (angular speed) ω_est of motor 1 estimated by speed/position estimator 54 and rotational speed ω_h detected by speed/position detector 55 are selected by switch 57 which operates in coordination with switch 56 to output rotational speed ω.

Magnetization controller 58 outputs magnetizing current command Id_com2, for magnetizing alnico magnet 9b determined based on the above obtained phase θ and rotational speed ω, to accumulator 59. Accumulator 59 outputs the sum of magnetizing current command Id_com2 and field weakening current command Id_com1 to current controller 60 as d-axis current command Id_ref. Further, rotation count command ω_ref given from external components is reduced by rotational speed ω by subtractor 61 to calculate the difference, which difference is proportionally integrated at proportional integrator 62 to be outputted to current controller 60 as q-axis current command Iq_ref.

Current controller 60 obtains the difference between d-axis current command Id_ref and d-axis current Id and the difference between q-axis current command Iq_ref and q-axis current Iq through subtractor 63d and subtractor 63q, respectively, which differences are proportionally integrated at proportional integrators 64d and 64q, respectively. The result of proportional integration is outputted to dq/uvw coordinate transformer 65 as output voltage commands Vd and Vq represented by d-q coordinate system.

Then, at dq/uvw coordinate transformer 65, voltage commands Vd and Vq are transformed into α-β coordinate system based representation and are thereafter further transformed into phase voltage commands Vu, Vv, and Vw. Of note is that a later described magnetic pole position θ is used in the calculation of coordinate transformation of dq/uvw coordinate transformer 65.

Phase voltage commands Vu, Vv, and Vw are inputted to power converter 66 to generate pulse-width modulated gate drive signal for supplying voltage that equals the command value. Inverter circuit 52 comprises a three-phase bridge configuration of switching elements such as IGBT (Insulated Gate Bipoloar Transistor) and receives supply of direct current voltage from a direct current power supply circuit not shown. The gate drive signal generated by power transformer 66 is given to the gates of the switching elements constituting inverter circuit 52 whereby a three-phase AC (Alternating Current) voltage being modulated in pulse width to conform to phase voltage commands Vu, Vv, and Vw are generated to be applied on stator winding 5 of motor 1.

In the above described configuration, a feedback control by PI (Proportional Integration) calculation is executed at current controller 60 so that d-axis current Id, q-axis current Iq equals d-axis current command Id_ref and q-axis current command Iq_ref, respectively. Angular speed estimate ω, which is the result of the control, is fed back to subtractor 61 and errorΔω converges to zero by the proportional integration by proportional integrator 62. Rotational speed ω thus, conforms to command speed ωref Speed/position estimator 54 estimates angular speed ω of motor and rotary position θ of rotor. Speed/position estimator 54 stores circuit constant, in other words, motor constant of motor 1 such as d-axis inductance Ld, q-axis inductance Lq of armature winding and winding resistance R and receives input of d-axis current Id, q-axis current Iq and d-axis output voltage command Vd. Speed/position estimator 54 estimates rotational speed ω_est of motor 1 using d-axis motor voltage equation represented below as equation (1).

$$Vd = R \cdot Id - \omega\_est \cdot Lq \cdot Iq \qquad (1)$$

Further, angular speed ω_est is integrated by integrator 67 and the result of integration is outputted as rotational position estimate θ_est.

Motor 1 is provided with a position sensor comprising a Hall IC including three Hall sensors 68 each dedicated to the three phases U, V, and W. Position signals Hu, Hv, and Hw outputted to the Hall sensors 68 are given to speed/position estimator 55. Speed/position estimator 55 calculates and outputs detected rotational speed θ_h, detected rotational speed θ_ω based on position signals Hu, Hv, and Hw.

Figure 5:
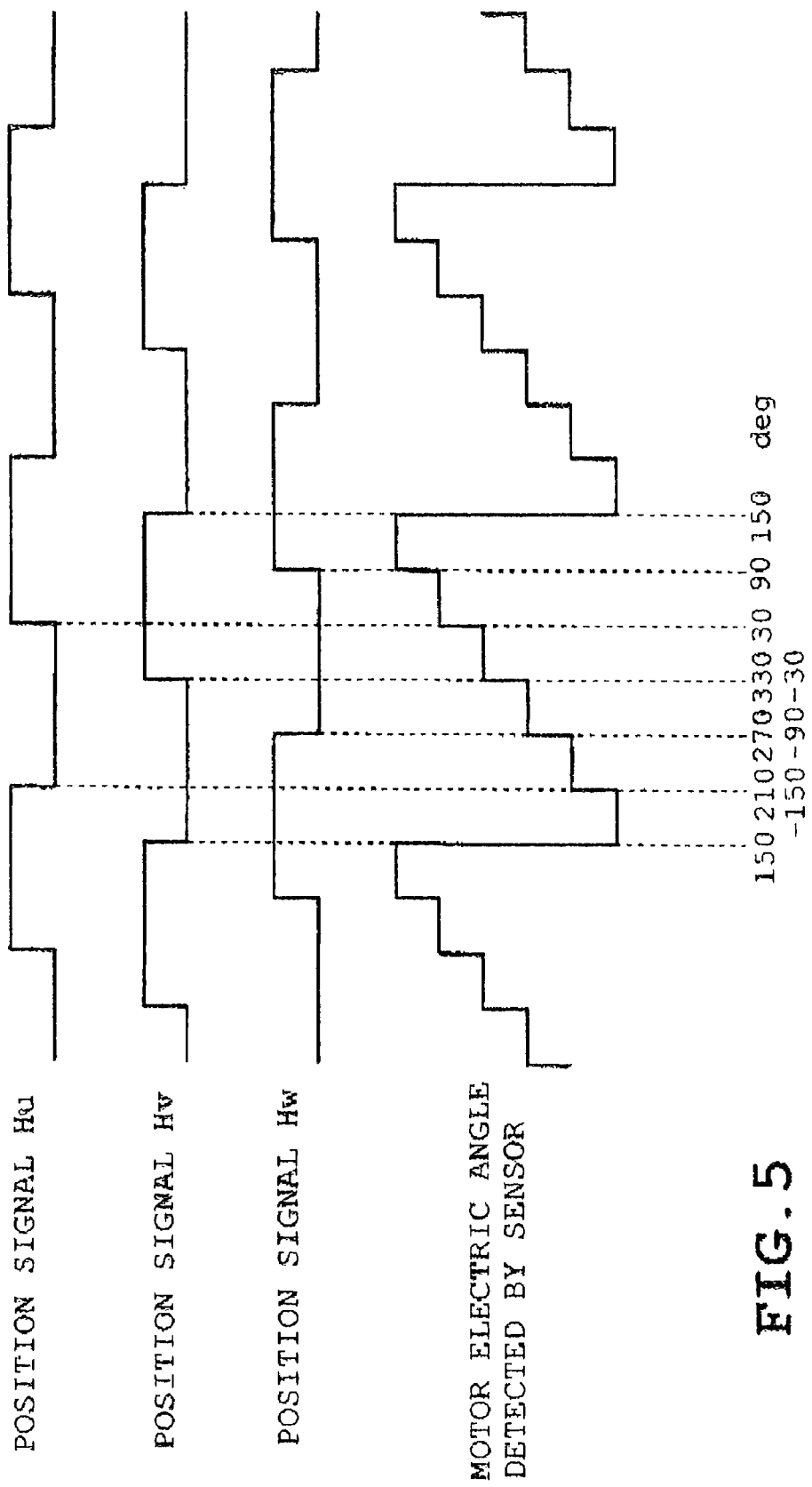
FIG. 5 indicates a relation between position signals Hu, Hv, and Hw outputted from a Hall sensor and electric angle.

FIG. 5 depicts the relation between position signals Hu, Hv, and Hw outputted by the three Hall sensors 68 and electric angle. The rising edge of position signals Hu, Hv, and Hw indicate 30 degrees, −30 (330) degrees, and 90 degrees respectively with 60 degrees difference between them. In this case, zero degrees in electric angle is located at the intermediary phase between the rising edge of position signal Hv and the rising edge of position signal Hu. Thus, the rising edges taken together with the falling edges provides rotor positions dividing a single electric angle period by sets of 60 degrees.

Motor controller 50 taken together with permanent magnet motor 1 constitutes motor control system 70. Components exclusive of inverter circuit 52 and power converter 66 are configured by software implemented on microcomputer of motor controller 50.

Next a description will be given on the operation of drum type washer dryer 21 provided with a permanent magnet motor 1. When the control circuitry instructs magnetization controller 58 to energize stator winding 5 through inverter circuit 52, armature counteraction generates external magnetic field, that is, a magnetic field generated by current flowing in stator winding 5, that is operated on permanent magnets 9a and 9b of rotor 3. Among permanent magnets 9a and 9b, magnetization of less coercive alnico magnet 9b is either reduced or increased by the aforementioned external magnetic field generated by armature counteraction operated on it to consequently increase or reduce the amount of magnetic flux or linked magnetic flux linked to stator winding 5. Thus, in the present exemplary embodiment, the control circuitry switches the level of magnetization of alnico magnet 9b depending upon the operational modes such as wash, dehydrate, and dry steps through control of energization of stator winding 5.

In the wash step, the control circuitry opens the water valve 30 to supply water into water tub 25 and thereafter rotates drum 27 to perform the wash. The wash step requires high torque to rotate drum 27 for turning wet laundry with baffle 29 but does not require high speed. Thus, control circuitry controls energization of stator winding 5 by inverter circuit 52 through magnetization controller 58 so that alnico magnet 9b is increased in magnetism. Thus, increased amount of magnetic flux or increased magnetic force is operated on stator winding 5 to rotate drum 27 at high torque and low speed.

In the dehydrate step, control circuitry opens drain valve 31 to drain water tub 25 and rotates drum 27 at high speed to dehydrate moisture from laundry. The dehydrate step requires drum 27 to be rotated at high speed in order to improve dehydrate efficiency but does not require high torque. Thus, control circuitry controls energization of stator winding 5 by inverter circuit 52 so that alnico magnet 9b is reduced in magnetism. Thus, reduced amount of magnetic flux or reduced magnetic force is operated on stator winding 5 to rotate drum 27 at low torque and high speed.

Finally, in the dry step, control circuitry activates blower fan 36 and heat pump 41 and rotates drum 27 for drying the laundry. In the dry step, the control circuitry controls energization of stator winding 5 by inverter circuit 52 so that magnetism of alnico magnet 9b is increased in preparation for the subsequent cycle of the wash step. Thus, the amount of magnetic flux to be operated on stator winding 5 can be increased to facilitate high-torque low-speed rotation of drum 27 in the wash step of the subsequent cycle.

Next a description will be given with reference to FIGS. 6A, 6B and 7 on a control executed for modifying the amount of magnetism of alnico magnet 9b and the amount of magnetic flux and properties of motor 1 depending on the operational mode of washer dryer 21. When stator 2 and rotor 3 of motor 1 are positioned as described in FIG. 6A, windings 5 of U-phase and W-phase are energized to generate a magnetic field that increases the magnetism of alnico magnet 9b represented as A and hereinafter referred to as magnet A.

In this case, the magnetic field generated by stator 2 is maximized in its amount of magnetizing flux when passing through magnet A provided at rotor 3 constituting ½ of the annularly disposed alnico magnets 9b arranged alternately with neodymium magnet 9a. The remaining other ½ of alnico magnets 9b represented as B and hereinafter referred to as magnet B are not exposed to the generated magnetic field and thus, magnetizing flux is minimized to exhibit no increase nor decrease in magnetism.

Figure 6A:
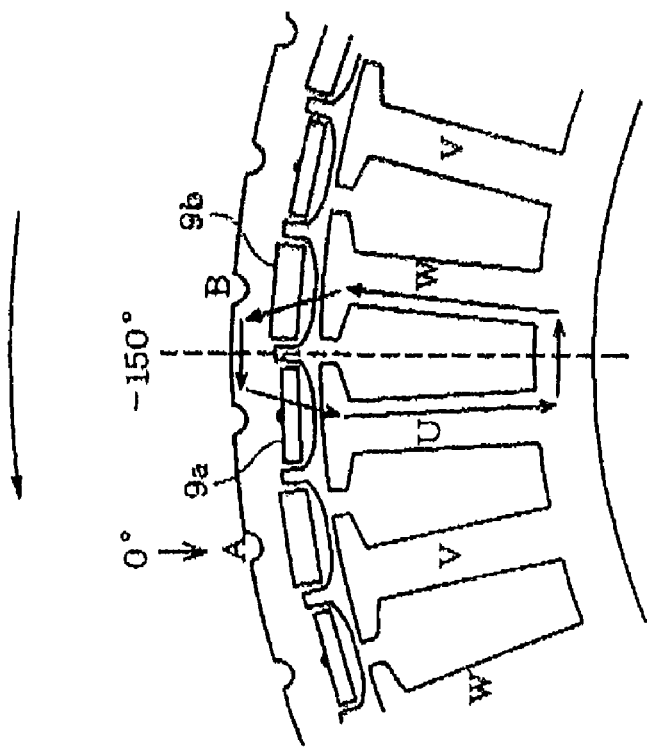
FIGS. 6A and 6B show a positioning of a stator and a rotor when magnetizing an alnico magnet.
Figure 6B:
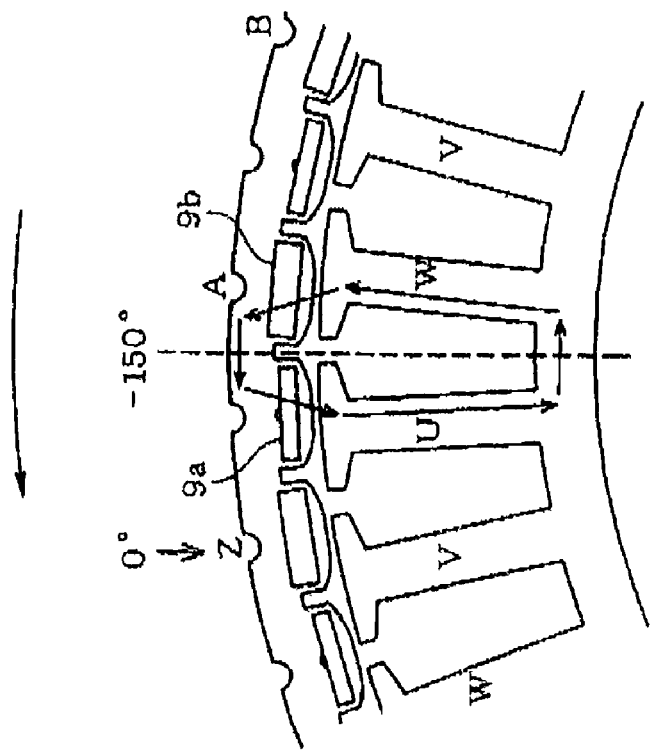

When increasing the magnetism of magnet B, if motor 1 is in rotation, a current to increase magnetism is energized for the second time when, as shown in FIG. 6B, magnet B reaches the position of magnet A shown in FIG. 6A. In this position, the amount of magnetizing flux passing through magnet B is maximized whereas magnet A is not exposed to the magnetic field generated by stator 2 and thus, maintains its magnetization.

If motor 1 is stopped and not in motion, rotor 3 is positioned by direct current excitation to a position shown in FIG. 6A and thereafter energized. The magnetism of alnico magnet 9b can be reduced by simply inversing the polarity of current energized in the U-phase and the W-phase in the above described position. Since the amount of increased or decreased magnetism of alnico magnet 9b is determined based on the amount of current energized in winding 5, if it is desired to increase the magnitude of the increase or decrease in magnetization, current should be energized in the amplitude proportionate to the desired increase/decrease of magnitude.

Next, a description will be given on the relation between energizable current and the count of motor rotation. The level of induced voltage generally increases with increase in the count of motor rotation. The following equation (2) is a q-axis motor voltage equation and it can be understood from the equation that q-axis voltage Vq increases with the increase in induced voltage Eq of motor 1.

$$Vq = R \cdot Iq + \omega \cdot Ld \cdot Id + Eq \qquad (2)$$

The following equation (3) represents output voltage Vdq of inverter circuit 52 which is equal to the root of square sum of d-axis voltage Vd and q-axis voltage Vq. Of note is that √( ) indicates the root of the figures within the parenthesis.

$$Vdq = \sqrt{(Vd^2 + vq^2)} \qquad (3)$$

Further, the difference between the direct current power supply Vdc supplied to inverter circuit 52 and the route of triple of output voltage Vdq equals overhead voltage Vdc' of inverter circuit 52.

$$Vdc' = Vdc - \sqrt{(3)} \cdot Vdq \qquad (4)$$

Current for increasing or decreasing the magnetism of alnico magnets 9b is energized by overhead voltage Vdc'.

For instance, if motor 1 is stopped, since the induced voltage amounts to zero, magnetization can be performed with 100% of direct current power supply voltage. On the other hand, if the count of rotation of motor 1 is high and output voltage Vdq amounts to 90% of direct current power supply voltage Vdc, energizing current for magnetization only amounts to 10%. Magnetizing/demagnetizing current Id is represented by the following equation (5).

$$Id = Vdc'/(R + \omega \cdot Ld) \qquad (5)$$

In the above described equation, ω indicates the time of rising edge and the Lime of falling edge converted into frequencies. It can be understood from the above equation that, since magnetizing/demagnetizing current is reduced as usable overhead voltage is reduced, if it is desired to dramatically modify the amount of magnetization of alnico magnet 9b, it is preferable to effect such control while motor 1 is rotating at low speed.

When magnetizing alnico magnets 9b at the position indicated in FIGS. 6A and 6B, the position of stator 2 and rotor 3 shown in FIG. 6A corresponds to the electric angle of −150 degrees when the position of alnico magnet 9b represented by Z in FIG. 6A corresponds to the electric angle of 0 (zero) degrees. The position shown in FIG. 6B corresponds to the electric angle period of −150 degrees. Thus, in the present exemplary embodiment, Hall sensor 68U is disposed such that the falling edge of position signal Hu outputted by sensor 68 corresponds to the electric angle of −150 degrees.

Figure 7:
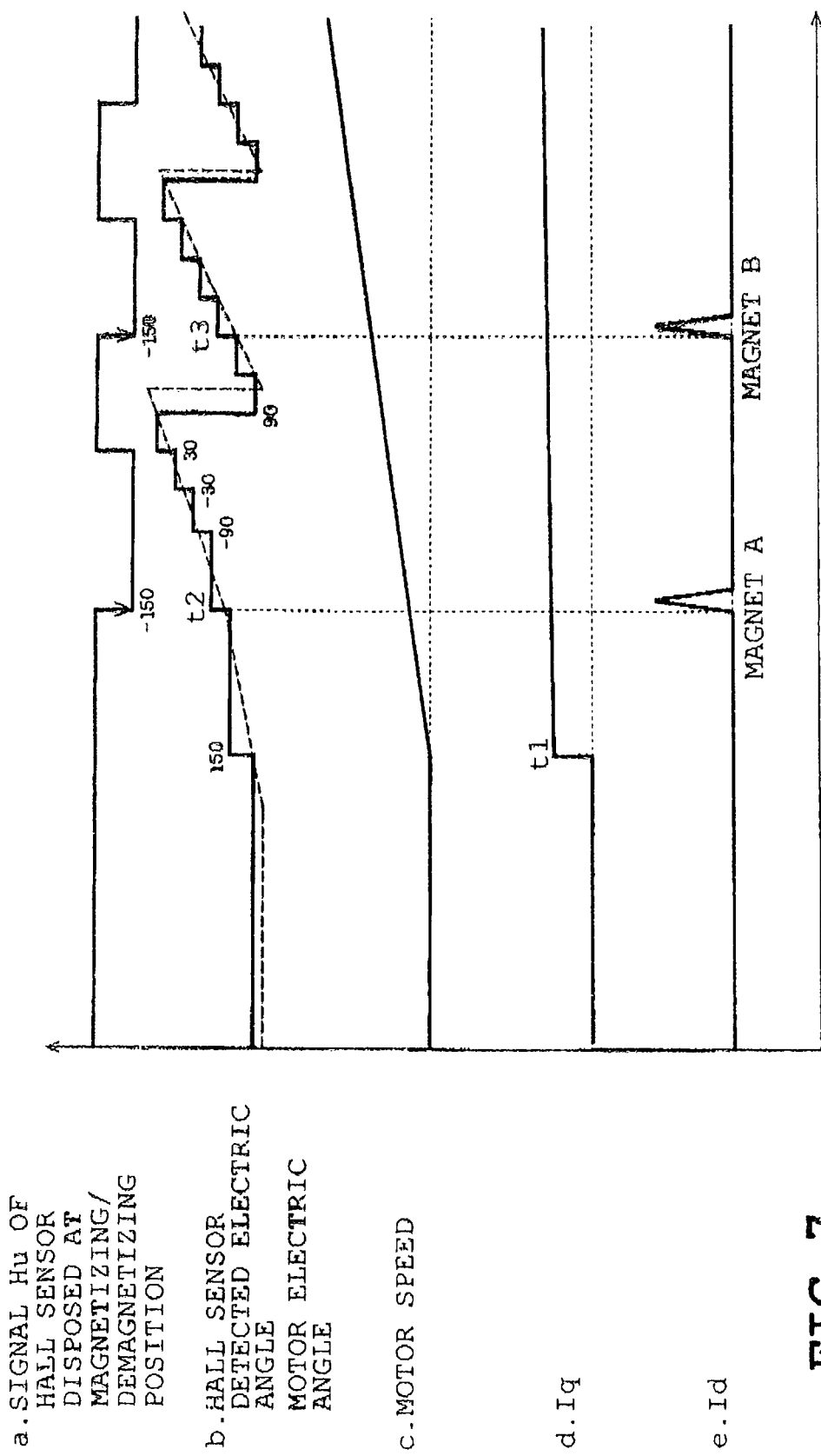
FIG. 7 is a timing chart indicating the magnetization of the alnico magnet immediately after start up.

FIG. 7 is a timing chart indicating the timings in which the processes involved in magnetizing alnico magnet 9b at positions shown in FIGS. 6A and 6B during the low speed rotation period immediately after the startup of a stopped motor 1 is executed. When motor 1 is at a stop, both q-axis current Iq and d-axis current Id indicate 0 (zero) and q-axis current Iq is energized based on the rotor position represented by electric angle sensed by Hall sensor 68 to startup motor 1 as can be seen in timing t1 of item d of FIG. 7.

Then, at timing t2 of item a and item b of FIG. 7, when falling edge timing of position signal Hu is −150 degrees, d-axis current Id serving as magnetizing/demagnetizing current is outputted in the form of pulses to execute the first magnetization, in other words, the magnetization of magnet A. When increasing the magnetism of alnico magnet 9b, current of positive polarity is energized whereas when reducing the magnetism, current of negative polarity is energized. Time span for energization for both cases is 1 ms to 20 ms, for example. The first energization is followed by motor 1 startup, and at the falling edge timing of position signal Hu one electric period after, d-axis current Id serving as magnetizing/demagnetizing current is similarly outputted in the form of pulses to execute the second magnetization, in other words, magnetization of magnet B in the position indicated at timing t3 of item a and item b of FIG. 7.

As described above, energization is carried out at the timing when falling edge of position signal Hu is initially detected from the state where motor 1 is stopped and at the timing when the subsequent falling edge is detected after 360 degree rotation in electric angle. It is projected that motor 1, in this case, is rotated at a very low speed ranging from 5 to 10 rpm considering the inertia of drum 27 and the load in the case of motor 1 used in washer dryer 21. With an assumption that induced voltage constant of motor 1 is approximately 0.25 [V/rpm], induced voltage of approximately 2.5V can be expected to be generated, meaning that if approximately 280V of direct current power supply voltage is supplied to inverter circuit 52, substantially 100% of such voltage can be used in the energization for increasing/decreasing the magnetism.

It is preferable in this case that the amplitude of magnetizing/demagnetizing current peaks at the electric angle of −150 degrees. For instance, if it takes 5 ms in the rising and the falling of magnetizing/demagnetizing current, the timing of energization should be advanced in phase by an amount corresponding to 5 ms. This adjustment can be generalized by equation (6) where ω (Hz) represents the count of rotation of motor 1 given by speed/position detector 55 or speed/position estimator 54, and t (sec) as rising time of magnetizing/demagnetizing current to obtain adjustment phase angle θadd (deg).

$$\theta add = t \times \omega \times 360 \quad (6)$$

For instance, if t=5 ms, and ω=20 Hz, since θadd amounts to 36 degrees, the actual energization is to be started at −150−36=−186 (degrees), that is, at +174 degrees.

Figure 8:
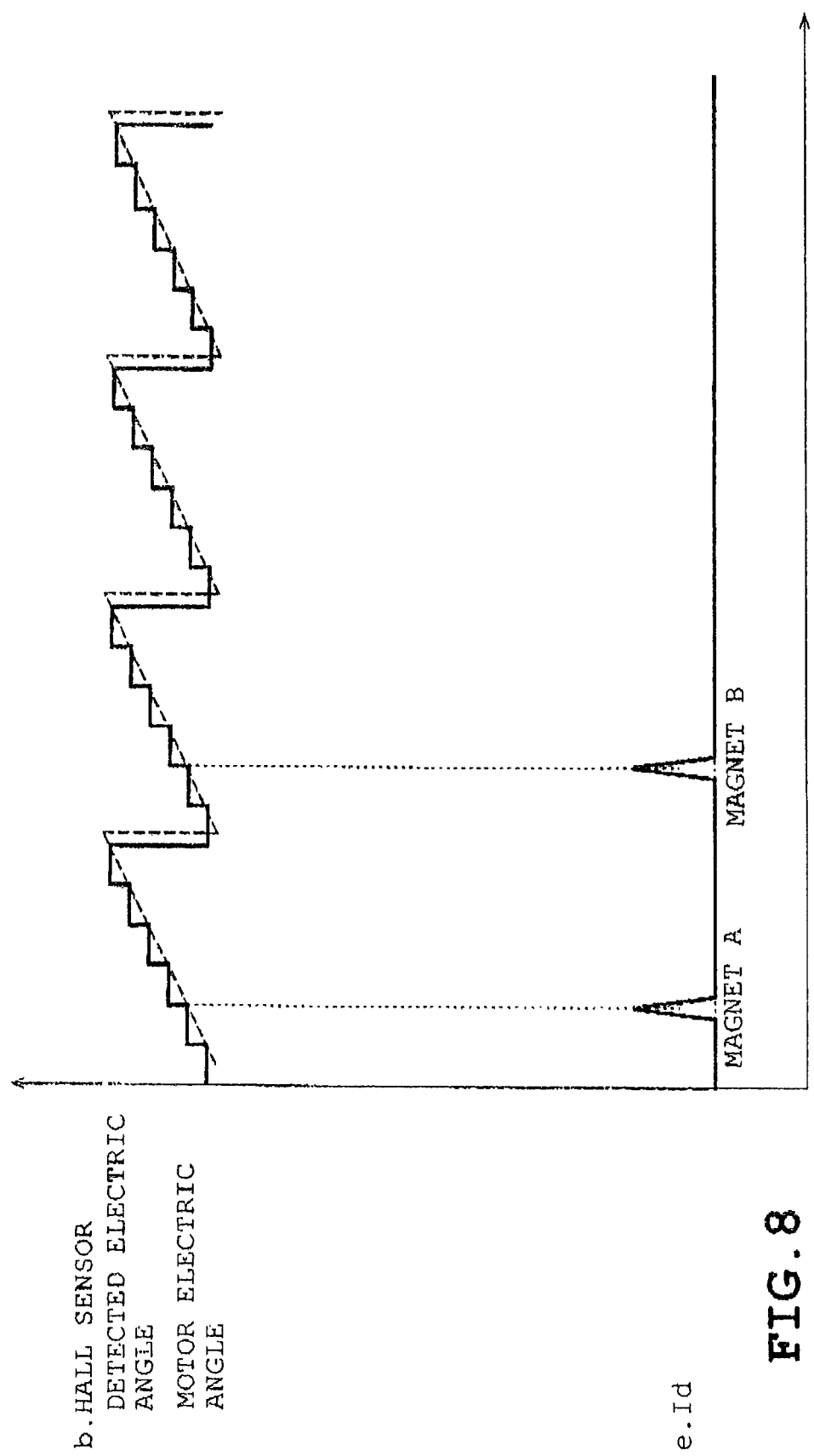
FIG. 8 corresponds to FIG. 7 when the motor is rotating at constant speed (first variation)
Figure 9:
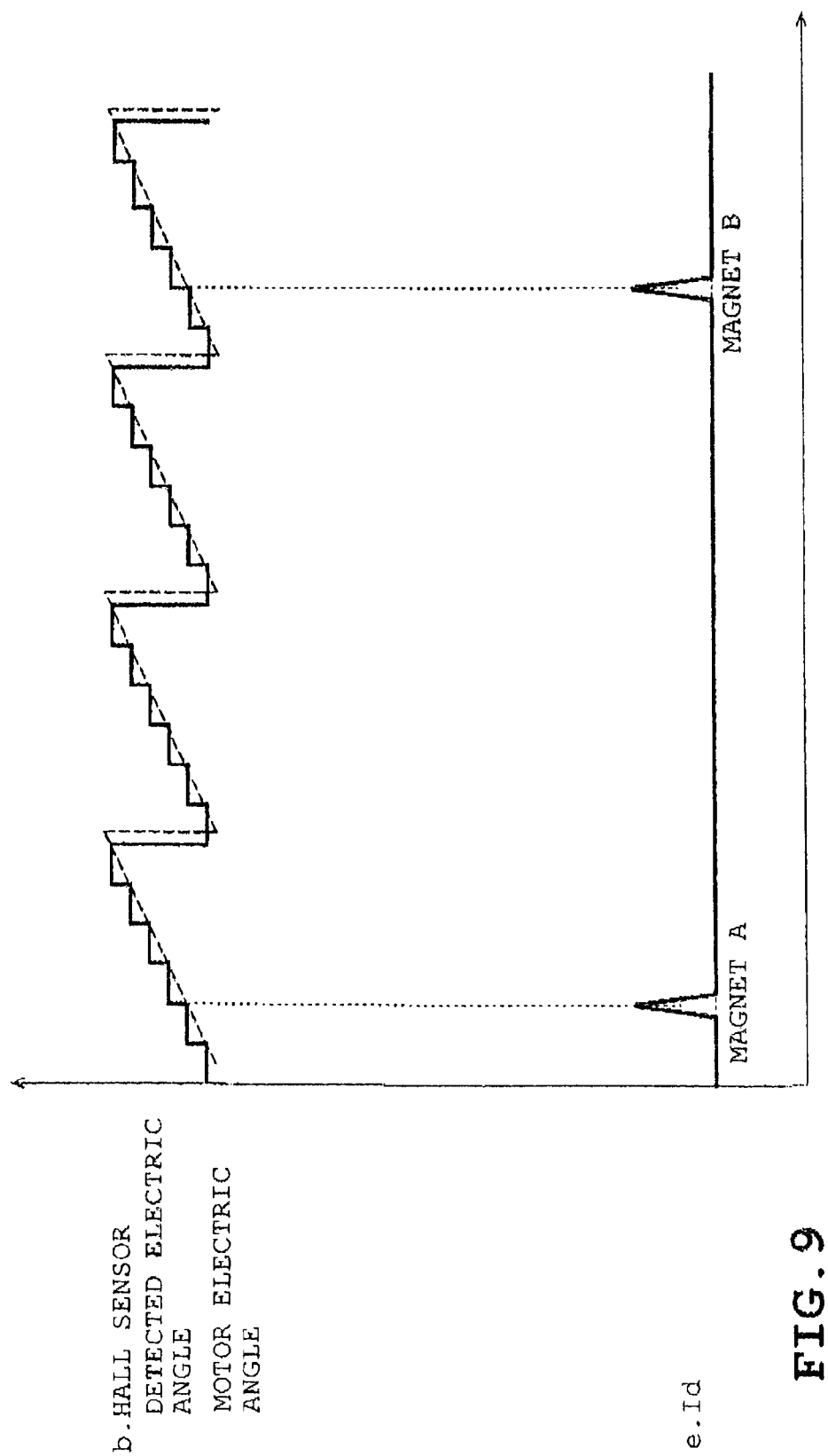
FIG. 9 corresponds to FIG. 7 when the motor is rotating at constant speed (second variation)

The magnetization executed twice at timings indicated in FIG. 7 is executed in the same way as the twice executed magnetization executed at timings indicated in FIGS. 8 and 9. FIGS. 8 and 9 only show timings of item b and item e of FIG. 7 and FIG. 8 indicates the case where the magnetization carried out in FIG. 7 is carried out when motor 1 is rotated at constant speed. FIG. 9 indicates the case where motor 1 is rotated at a constant speed and the second energization is carried out three electric periods after the first magnetization of magnet A to energize magnet B. This is because the most suitable magnet for magnetization switches over alternately as in B, A, B, A . . . , upon elapse of a single electric period.

According to the above described exemplary embodiment, Hall sensors 68 are provided at permanent magnet motor 1 of a 48 pole 36 slot configuration having a low coercivity alnico magnet 9b provided at rotor 3. Magnetization controller 58 energizes windings 5 of motor 1 twice through inverter circuit 52 at a same electric angle belonging to different electric angle periods specified by the sensor signal outputted by Hall sensor 68 to magnetize every single alnico magnet 9b provided at rotor 3 to the same level of magnetization.

Thus, in a 48 pole 36 slot configuration, stator 2 and rotor 3, when positioned at a specific electric angle, optimally magnetizes ½ of alnico magnets 9b which are disposed alternately with neodymium magnet 9a. When a single electric period elapses from such position, the remaining other ½ is now in position for optimal magnetization. Thus, all of alnico magnets 9b provided at rotor 3 can be magnetized at the same level of magnetization.

Further, magnetization controller 58 magnetizes alnico magnet 9b at timings where the rotational position assumes a position when the amount of magnetic flux passing through the targeted alnico magnet 9b for magnetization (such as magnet A shown in FIG. 6) is maximized and when magnetic flux passing through alnico magnets 9b which is not targeted for magnetization (such as magnet 8 shown in FIG. 6) is minimized. Thus, ½ of the alnico magnets 9b can be magnetized without affecting the state of magnetization of the remaining other ½.

Yet, further, among the plurality of Hall sensors 68, Hall sensor 68U is disposed at motor 1 such that the falling edge of position signal Hu, in which the maximum level of variation is observed, is outputted all the rotational position where magnetization controller 58 executes magnetization. Thus, the timing of magnetization can be readily identified by detecting the falling edge. Still further, since magnetization controller 58 executes magnetization immediately after the startup of motor 1, the amount of magnetization of alnico magnet 9b can be modified dramatically through magnetization by energization with high voltage output while the induced voltage at motor 1 is low.

Furthermore, magnetization controller 58 advances the timing of magnetization as the rotational speed of motor 1 increases, thus, alnico magnet 9b can be magnetized at the position where the magnetic field, generated at the peak of magnetization current amplitude, is maximized.

Since washing machine 21 generates drive force by permanent magnet motor 1 having the above described advantages, the properties of motor 1 can be optimized to operate at low speed and high output torque in the wash operation and at high speed and low output torque in the dehydration operation to advantageously reduce power consumption. Especially in the dehydrate operation, field weakening control can be eliminated or minimized to increase the count of rotation of motor 1 and thereby improve efficiency. Further, by controlling the permanent magnet motor that, drives compressor 39 of heat pump 41 in the same manner, the dry operation can be operated with the same advantages.

Figure 10A:
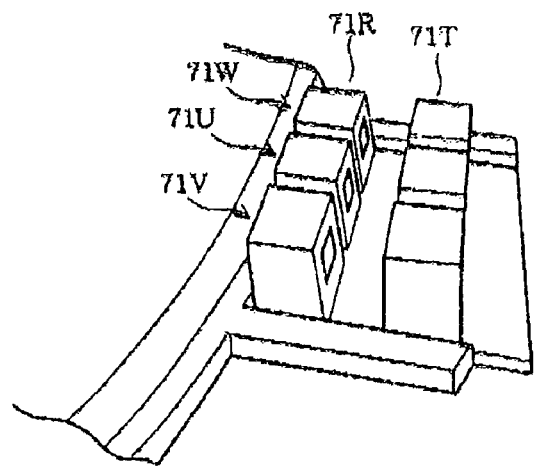
FIGS. 10A to 10C depict a second exemplary embodiment and shows a configuration of an optical position sensor.
Figure 10B:
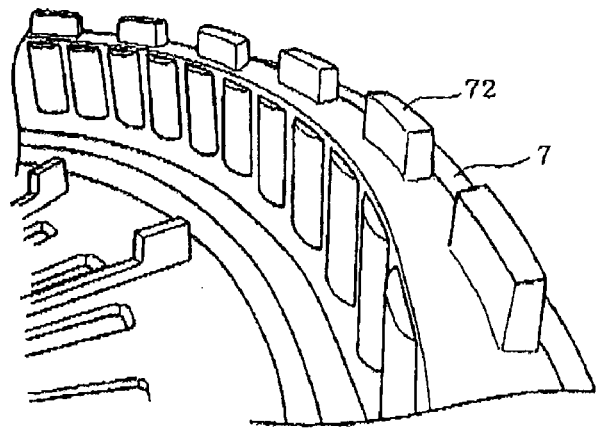
Figure 10C:
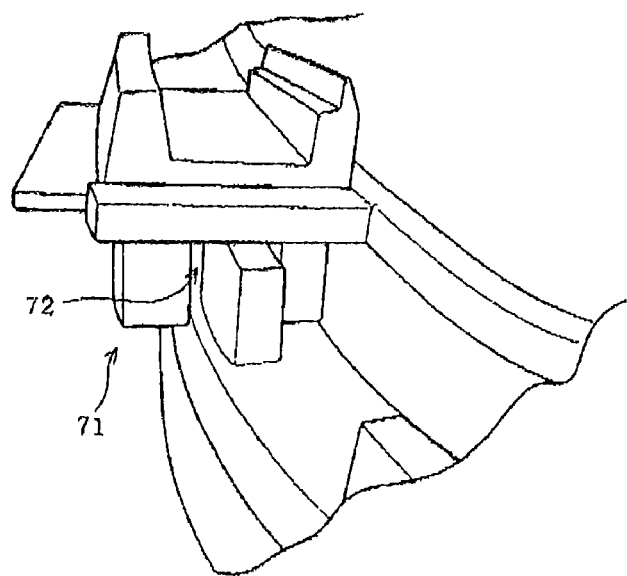
Figure 11A:
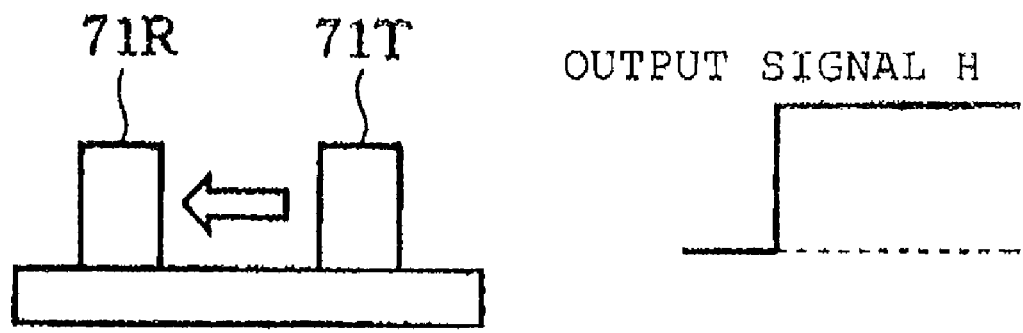
FIGS. 11A and 11B are descriptive views of position detection performed by the optical position sensor.
Figure 11B:
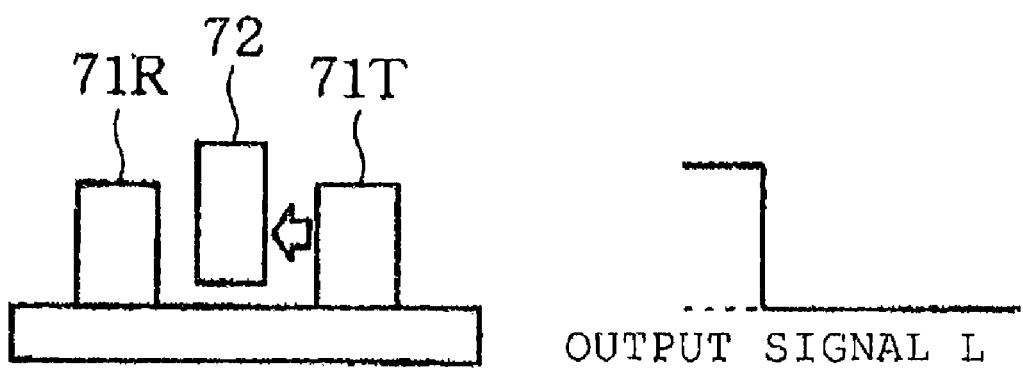

FIGS. 10 and 11 indicate a second exemplary embodiment of the present invention and the elements of the second exemplary embodiment are identified with reference symbols identical to the first exemplary embodiment if they are identical to the first exemplary embodiment. A description will be given hereinafter only on the portions that differ. In the second exemplary embodiment, Hall sensor 68 employed in the first exemplary embodiment is replaced by an optical position sensor 71.

FIG. 10B is a partial perspective view of the lower end side of frame 7 of rotor 3. As can be seen in FIG. 10B, protrusion 72 is formed at the lower end of frame 7 so as to correspond to each of alnico magnets 9b. Position sensor comprises a transparent optical sensor 71 and is configured by a combination of light emitting element 71T and light receiving element 71R as shown in FIG. 10A. The sets of light emitting element 71T and light receiving element 71R are represented as 71W, 71U, and 71V, and are each spaced apart by 60 degree electric angle in listed sequence from the far side to the near side of FIG. 10A.

FIG. 10C shows motor 1 in assembled state in which position sensor 71 of the stationary side oppose projection 72 so that when rotor 3 is rotated, projection 72 passes between light emitting element 71T and light receiving element 71R of position sensor 71 to block the light emitted from light emitting element 71T from being received by light receiving element 71R. Thus, the output signal, in other words, the position signal is altered from high level to low level.

The use of position sensor 71 provides the operation and effect of the first exemplary embodiment in less cost since the optical position sensor 71 costs less than Hall sensor 68.

The present invention is not limited to the above described or shown exemplary embodiments but may be modified or expanded as follows.

Alnico magnet 9b may be magnetized immediately before the rotation of motor 1 is stopped.

Magnetization need not be performed at the timing to conform to the falling edge of position signal Hu, but may also be adjusted to conform to the rising edge or either of the rising and falling edges of position signals Hv, and Hw. Moreover, magnetization need not be timed to correspond to the edges but may be timed to vary by a predetermined phase from the edges.

The present invention may be applied to IPM (Interior Permanent Magnet) type permanent magnet motors disclosed in the aforementioned JP 2006-280195 A.

The present disclosure may be applied to washers without dry features.

The low coercivity permanent magnet is not limited to alnico magnet 9b but may be replaced by permanent magnets made of any material that has a coercivity low enough to modify the amount of magnetization by the magnetic field generated by energization through an inverter circuit. Similarly, the high coercivity permanent magnet is not limited to neodymium magnet 9a.

Further, if the required operational properties can be obtained by modification in the amount of magnetization of low coercivity permanent magnet, the high coercivity permanent magnet is not required.

The permanent magnet is not limited to those with 48 pole 36 slot configuration but may be replaced by motors having 4 poles per 3 slots.

Modification in the timing of magnetization based on rise time of magnetizing current only needs to be carried out on a required basis. For instance, if the rise time is ignorably small or if adjustment is made in the disposition of the position sensors in consideration of the rise time, no modification is required.

The present invention is not limited to application to washers air and conditioners but may be applied to any appliances etc. that modify the amount of magnetic flux of motor including a low coercivity permanent magnet.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A motor controller that controls a permanent magnet motor including a rotor including a plurality of low coercivity permanent magnets having a coercivity low enough to allow modification in amount of magnetization, the motor controller comprising:
a position detector including one or more position sensors to detect a rotational position of the rotor;
an inverter circuit that is connected between a direct current voltage supply source and windings of the permanent magnet motor and that is configured by a plurality of semiconductor switching elements of multiple phases connected thereto; and
a magnetization controller that magnetizes the plurality of low coercivity permanent magnets by energizing the windings through the inverter circuit,
wherein all of the low coercivity permanent magnets are magnetized to a uniform level of magnetization by energizing the windings twice at a same electric angle belonging to different electric angle periods specified based on a sensor signal outputted by the position sensor.

2. The motor controller according to claim 1, wherein the permanent magnet motor takes a 4 pole 3 slot configuration.

3. The motor controller according to claim 1, wherein the rotor is configured by the plurality of low coercivity permanent magnets and a plurality of high coercivity permanent magnets disposed alternately, the high coercivity permanent magnets having a coercivity high enough to disallow modification in amount of magnetization.

4. The motor controller according to claim 1, wherein the magnetization controller magnetizes the low coercivity permanent magnets at a timing when a rotational position is reached where amount of magnetic flux of low coercivity permanent magnets targeted for magnetization are maximized and where amount of magnetic flux of low coercivity magnets untargeted for magnetization are minimized.

5. The motor controller according to claim 4, wherein at least one of the position sensors is positioned at the permanent magnet motor such that level of variation in sensor signal is maximized at the rotational position where the magnetization controller magnetizes the low coercivity permanent magnets.

6. The motor controller according to claim 1, wherein the magnetization controller magnetizes the low coercivity permanent magnets immediately after startup of the permanent magnet motor or immediately before the permanent magnet motor is stopped.

7. The motor controller according to claim 1, further comprising a speed detector that detects a rotational speed of the permanent magnet motor and wherein the magnetization controller advances the timing of magnetization as the rotational speed increases.

8. A motor control system, comprising:
a permanent magnet motor including a rotor including a plurality of low coercivity permanent magnets having a coercivity low enough to allow modification in amount of magnetization;
a position detector including one or more position sensors to detect a rotational position of the rotor;

an inverter circuit that is connected between a direct current voltage supply source and windings of the permanent magnet motor and that is configured by a plurality of semiconductor switching elements of multiple phases connected thereto; and a magnetization controller that magnetizes the plurality of low coercivity permanent magnets by energizing the windings through the inverter circuit, wherein all of the low coercivity permanent magnets are magnetized to a uniform level of magnetization by energizing the windings twice at a same electric angle belonging to different electric angle periods specified based on a sensor signal outputted by the position sensor.

9. A washing machine, comprising:

a permanent magnet motor including a rotor including a plurality of low coercivity permanent magnets having a coercivity low enough to allow modification in amount of magnetization;

a position detector including one or more position sensors to detect a rotational position of the rotor;

an inverter circuit that is connected between a direct current voltage supply source and windings of the permanent magnet motor and that is configured by a plurality of semiconductor switching elements of multiple phases connected thereto; and a magnetization controller that magnetizes the plurality of low coercivity permanent magnets by energizing the windings through the inverter circuit, wherein all of the low coercivity permanent magnets are magnetized to a uniform level of magnetization by energizing the windings twice at a same electric angle belonging to different electric angle periods specified based on a sensor signal outputted by the position sensor, wherein a rotational drive force for executing a wash operation is generated by the permanent magnet motor.

* * * * *